June 15, 1943. J. G. DOUGLAS 2,322,000
STEERING GEAR
Filed Jan. 27, 1938 4 Sheets-Sheet 1
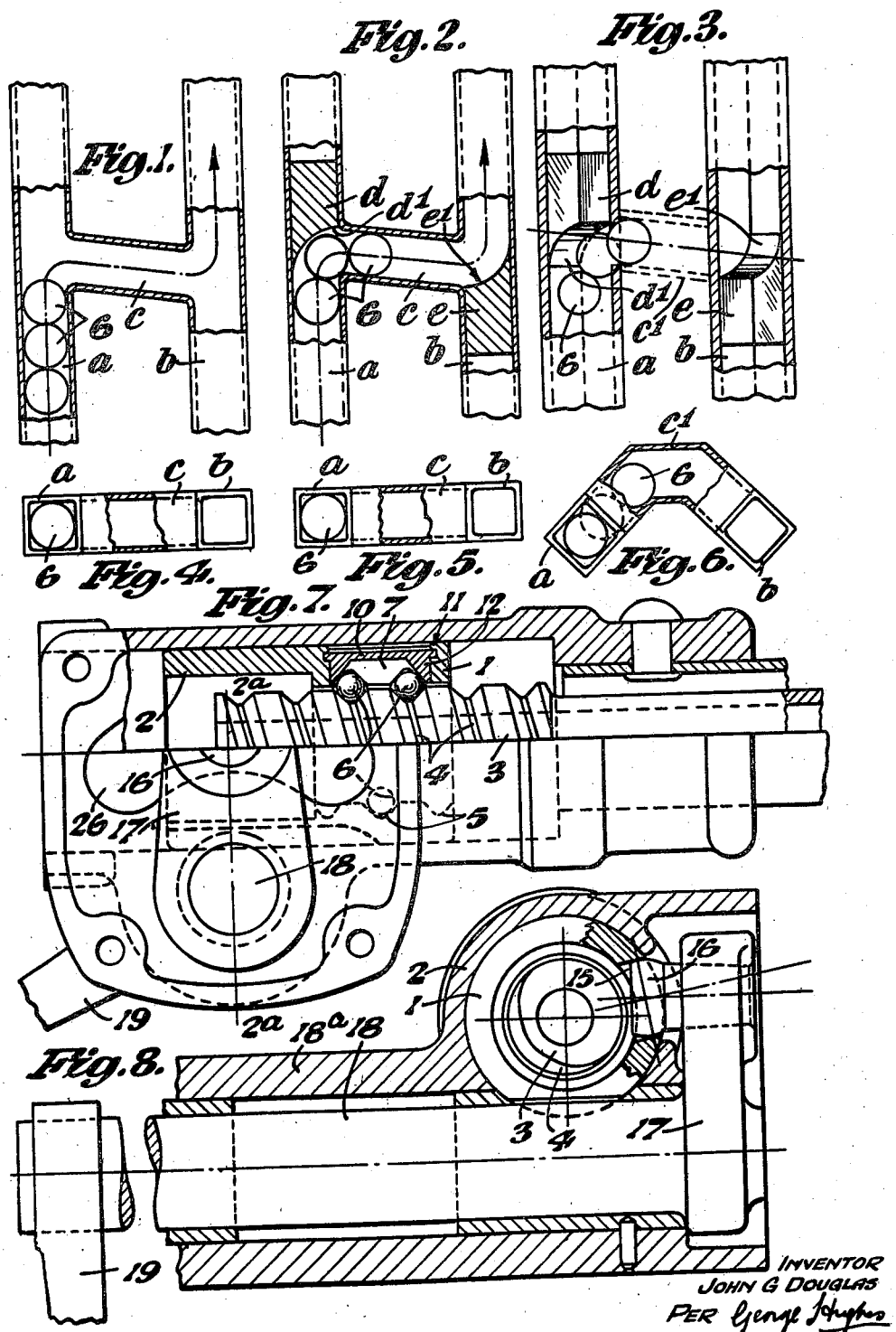

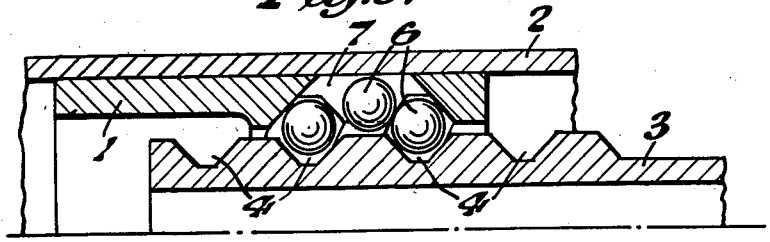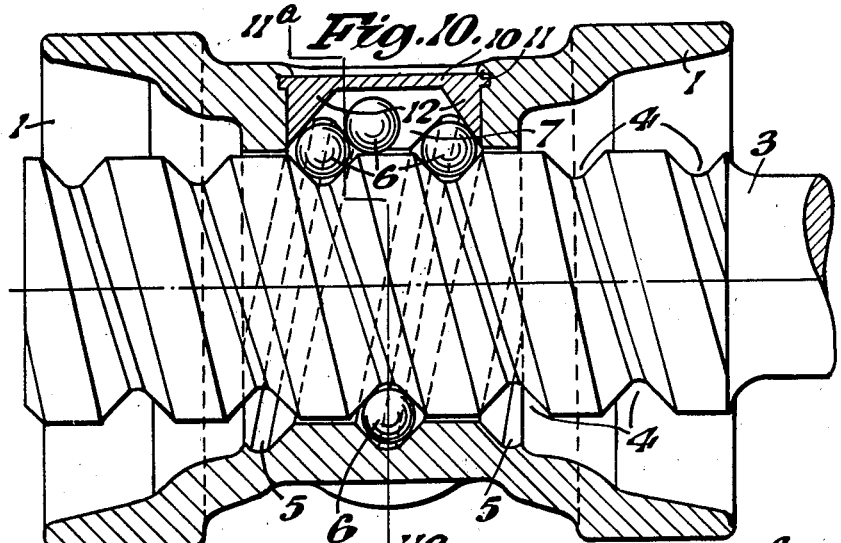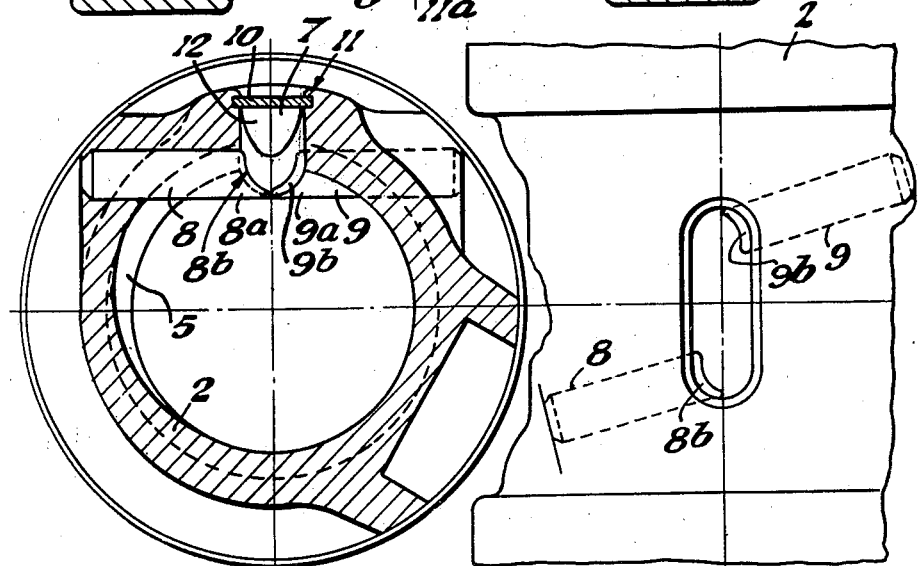

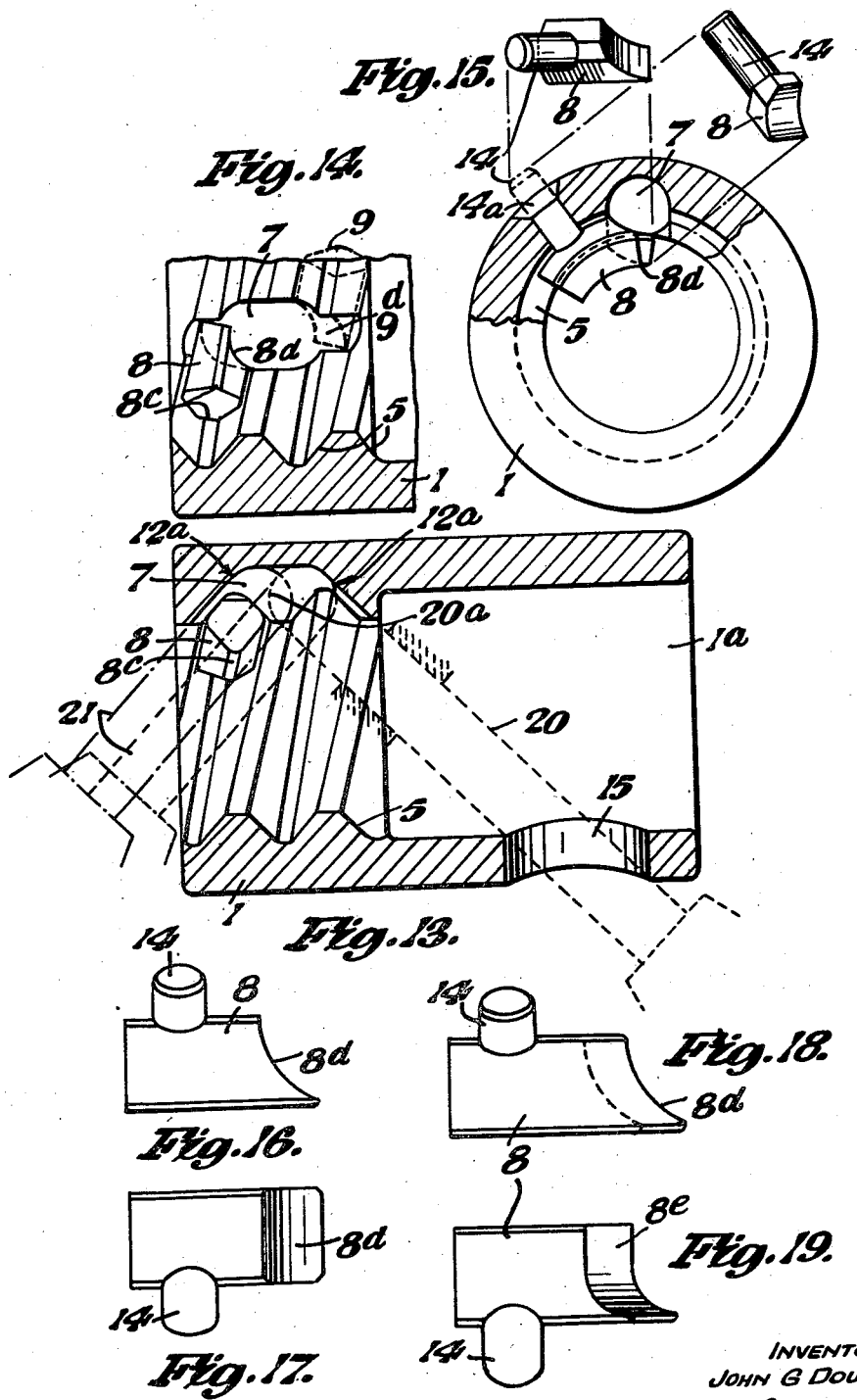

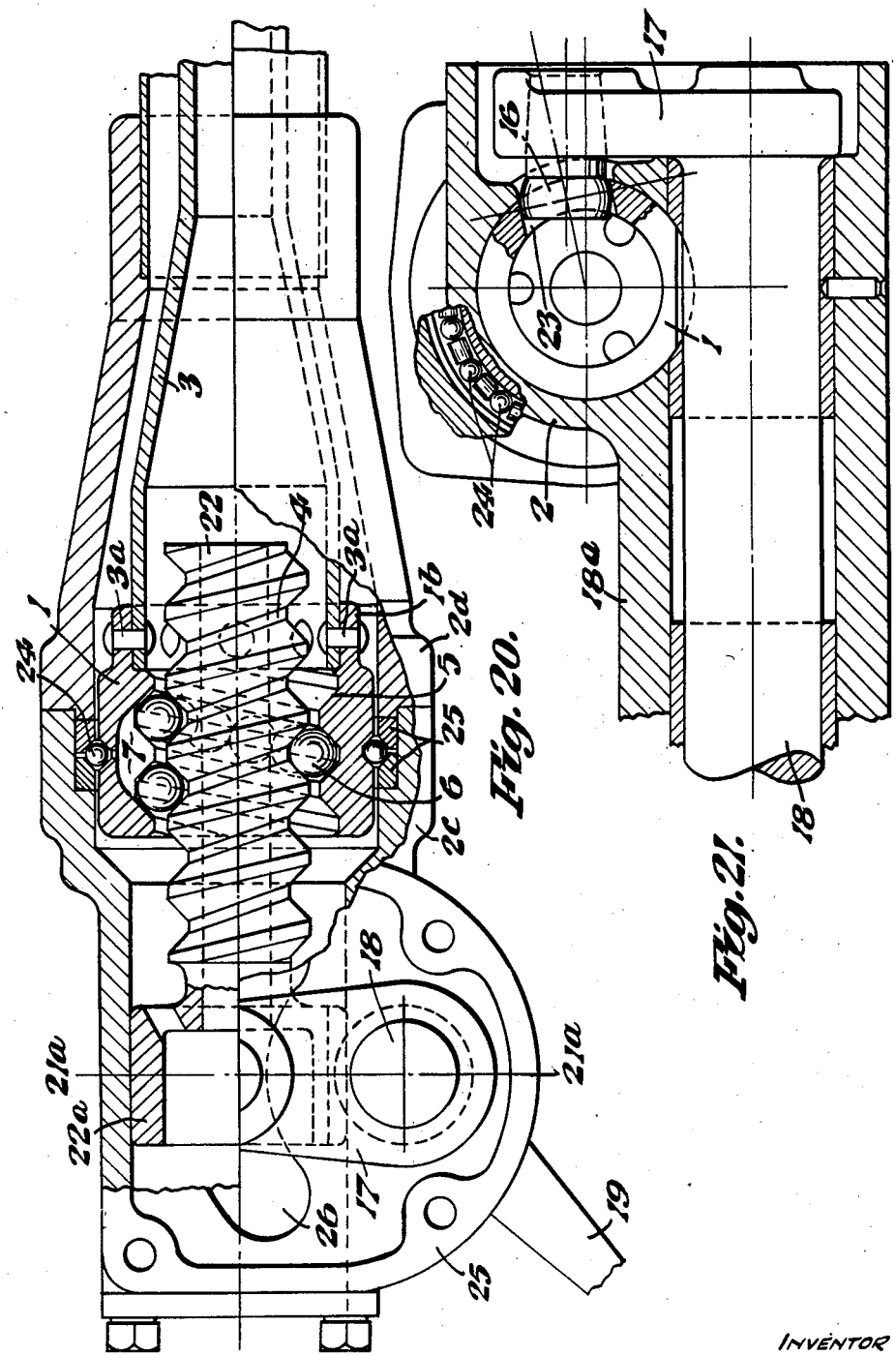

Patented June 15, 1943

2,322,000

UNITED STATES PATENT OFFICE 2,322,000

STEERING GEAR

John George Douglas, Aberfeldy, Scotland

Application January 27, 1938, Serial No. 187,207
In Great Britain February 23, 1937

17 Claims. (Cl. 74—499)

My present invention relates to worm and nut steering gear and the like in which a worm shaft member has disposed about it a nut member, one of which members is adapted to have imparted thereto a movement of translation by rotation of the other member for the purpose of actuating dirigible road wheels or their equivalent through the medium of suitable transfer mechanism, e. g. rocker arm, drop arm and other known parts. The invention may be applied to steering gear in which the nut is restrained against rotary movement in the customary housing, but in the preferred form the invention is applied to the known type of steering gear in which the nut is not restrained against rotation but is in fact mounted as a cylindrical sliding and partially rotary element in a cylindrical housing, e. g. as described in U. S. A. Patent No. 1,893,764, in which the nut has a radial parallel hole engaged by the ball head of a peg projecting laterally from the rocker arm so that the nut will turn on its axis to adapt itself to the arcuate movement of the rocker arm whilst it (the nut) is moving axially. The chief object of the present invention is to obtain a low rotatory friction contact between the nut and worm shaft for the purpose of transferring motion from the shaft to the nut or vice-versa, by the use of anti-friction members interposed between the worm and nut. Another object of this invention is to provide a screw and nut mechanism for steering gear which obviates complicated arrangements of joints and hinges to obtain a live and sensitive steering suitable to meet modern demands and which obviates parts liable to wear quickly, the latter being a fault of certain steering gears at present in use resulting in steering faults and discomfort due to transfer of shocks to the steering wheel. A still further object of the present invention is to enable the advantages appropriate to the use of anti-friction members between the screw and nut to be combined with the advantages of the type of steering gear at present in use which adopts a nut which is not restrained against rotation but is mounted as a cylindrical piston-like member which can rotate on its axis within the appropriate housing, such gear being described in the aforesaid U. S. A. Patent No. 1,893,764.

According to this invention worm and nut steering gear is provided with opposed complementary helical grooves in the worm and nut, balls fitting and rolling in said grooves and forming a driving couple between the worm and nut for both directions of relative rotary steering movement of worm and nut, and means to restrain the anti-friction members within a predetermined endless track of travel between the ends of the nut about the axis of the worm, such endless track being wholly exposed to the worm.

The nut may be mounted in a housing so that it has a movement of translation imparted thereto by rotation of the steering shaft carrying a worm, the nut being suitably connected to a rocker arm, or the nut may be formed at the lower end of the shaft and the worm may be a separate member translatively movable along the housing and engaged at one end in the nut and suitably connected at its other end to the rocker arm. It is preferred to adopt a single helix of balls and to locate in the nut an approximately axially directed longitudinal transfer port forming a path between and approximately at right angles to the ends of a single helix of the worm and into which the balls pass successively, the transfer port being shaped at its ends to guide the balls with easy rolling action from the point at which each leaves the worm and turns around an approximately right-angled corner to enter the transfer port and similarly from the port back to the worm. The transfer port may be simply a slot with inclined guiding ends, the outer wall of the port being the interior of the cylindrical housing in which the nut is mounted, or if desired a small plate can be fitted into the nut to close the greater radius side of the slot forming the transfer port or a rod axial with the port and with ends fast in either end of port can be used.

In order that my invention may be clearly understood and readily carried into effect four sheets of drawings are appended hereto illustrating embodiments thereof, and wherein:

Figs. 1, 2 and 3 are purely diagrammatic views intended to facilitate comprehension of the method I propose for obtaining a continuous circulation of the balls about the worm axis.

Figs. 4, 5 and 6 are part sectional projected end views of Figs. 1, 2 and 3 respectively.

Fig. 7 is a sectional side elevation view of an embodiment in which the transfer port in the nut is closed by a spun-in plate.

Fig. 8 is a section on the line 2a—2a of Fig. 7.

Fig. 9 is a detail sectional side elevation showing a slight modification consisting in using the inside periphery of the nut housing to close the outer side of the said transfer port.

Fig. 10 is a sectional side elevation showing an alternative method of forming the transfer port in the nut for the balls.

Fig. 11 is a section on the line 11a—11a of Fig. 10.

Fig. 12 is a plan view of the nut adopted in Figs. 10 and 11.

Fig. 13 is a sectional side view of a slightly modified form of the nut and also showing one method of forming the transfer port and the combination therewith of block members adapted to form deflectors.

Fig. 14 is a broken detail sectional view through the nut of Fig. 13 showing the inner face view of the transfer port.

Fig. 15 is a part sectional end elevation view of the nut shown in Figs. 13 and 14 combined with projected views of one of the deflector blocks.

Figs. 16 and 17 are detail views at right angles to each other of a deflector plug showing the radiused end.

Figs. 18 and 19 are similar views to Figs. 16 and 17 respectively but embodying a slight modification.

Fig. 20 is a part sectional side elevation view showing a modified arrangement in which the worm is mounted for movement of translation and the nut is part of the steering shaft.

Fig. 21 is a broken section on the line 21a—21a of Fig. 20.

Referring to the drawings all of the embodiments to be described have the common feature that a single helix-full of balls forms a driving couple between a worm and a nut both of which have complementary worm grooves in which the helix-full of balls rolls. It will be evident that unless some device is introduced to restrain the balls from travelling freely along the helical grooves that the balls would gradually roll out of one or both ends of the nut. In this respect the device should be of such a character as not to impede the free rolling action of the balls in the helical grooves, as otherwise the desired smoothness of operation would be impaired. These two features introduce the problem of preventing translative movement of the whole circle of balls relatively to the nut and therefore in order to clearly appreciate the hereinafter described methods of achieving this result reference should first be made to Figs. 1 to 6 inclusive.

Figs. 1 and 4 show a diagrammatic representation of two adjacent helical grooves in the worm and nut, straightened out from their curvature around the axis, and joined by a short branch $c$ about at right angles; this branch pipe representing what is hereinafter referred to as the transfer port; the cross-section of the two long pipes $a$ and $b$ representing the helix in the worm and nut, and of the short pipe connecting them, is square as shown in Fig. 4, corresponding to the cross-section of the combined grooves in worm and nut; the arrow shows the required path of the loosely fitting balls that are travelling along the long pipes.

Fig. 2 is the same as Fig. 1, but abutments or stops in the form of deflector blocks $d$ and $e$ have now been fastened in the long pipes, with their radiused end faces $d^1$ and $e^1$ situated so that, in effect, the channel along which the balls must now travel is a single pipe, having two sharp bends in it, one right hand the other left hand. It is now obvious that to effect this travel around the sharp bends, the radius of the end faces of stops or deflector blocks must be struck from the inside corner of each bend, and must be a dimension equal to one ball diameter plus a small amount to allow the ball to swing around this sharp inside corner in the pipe, freely, the preferred radius being 1½ ball diameters.

Fig. 3 is somewhat the same as Fig. 2, but in it the two long pipes have been turned longitudinally or on their axes through 45 degrees, so that their hitherto upright sides are now at 45 degrees to the vertical, and therefore the branch or connecting short pipe, still in place just as in the other two figures, is now bent in the middle inverted V fashion at 90 degrees in order that its two ends may still meet the long pipes as previously; obviously no alteration whatever has taken place in the action or positioning of the two blocks $d$ and $e$; and balls travelling along the left-hand pipe, as in the other two figures, will still be caused to round the sharp corner but will now travel up the branch pipe at an angle of 45 degrees instead of horizontally as in Figs. 2 and 5.

If the apex of the bend in the short connecting pipe be now cut off, and a short horizontal length of pipe be used to again connect it up, as at $c^1$ in Fig. 6, it is evident that if the pipes $a$ and $b$ are the adjacent bends of a convolution of a pipe of helical form that the balls can circulate around a single convolution indefinitely. In practice the nut and worm hereinafter described have complementary helically grooved parts which in effect form a helical pipe, the ball about to enter the left hand end of the transfer port $c$ and the ball which has just left the right hand end of said transfer port forming the end balls of a single helix of balls which carry the load, i. e. connect the worm to the nut. Consequently, in order to complete the continuity or endless arrangement of balls a few more balls must nearly fill the transfer port. In Fig. 6 the four inclined sides of each pipe $a$ and $b$ can be regarded as representing two opposed V section worm grooves, and of course in practice the opposed grooves would not meet at their outer corners, the balls serving to space the worm and nut.

Referring now to the remaining figures of the drawings the embodiments shown make use of a cylindrical nut 1 supported by its periphery in a cylindrical housing 2, e. g. in the same manner as described in U. S. A. Patent No. 1,893,764, a worm shaft 3 supported by the screw element or members for rotation in the housing and nut passing through the nut but in the present invention not having direct engagement with the nut. Helical grooves 4 are provided in the outside or crest diameter of the worm and at 5 in the bore or root diameter of the nut, and these grooves receive antifriction members such as steel balls 6, nearly one half of such balls being sunk in the worm groove 4 and nearly one-half in the nut groove 5, but the crest diameter of worm being smaller than the root diameter of nut so that a small annular clearance exists between nut and worm when assembled. I prefer to make use of substantially only one complete turn or helix of the nut groove, for the support of the balls 6, and the start and finish of this helix is connected by a transfer port or duct 7 arranged substantially axially of the worm, or if desired at an angle thereto, the height or depth of the port being such as to freely permit the balls to pass along it over the crest of the worm, and its width similarly affording a free fit for the balls. Means is provided to deliver the balls positively successively into the transfer port 7 and for their exit therefrom and for this purpose two deflector plugs 8 and 9 (more clearly shown in the modification illustrated in Figs. 10, 11 and 12) are fitted fast in the nut with their axes tangential or nearly so to the pitch circle of the helix-full of balls viewed axially, so that the inner ends of these plugs 8a, 9a enter the sides of the transfer port at its ends, that is, as shown in Fig. 12, one lead or pitch of the helix apart. The end faces of these plugs are radiused as indicated at 8b and 9b in Fig. 11 in the direction required to cause the leading ball, e. g. that nearest the appropriate end of the port to rise out of the worm groove, following the slope of the flank of groove in worm, and incline towards the other end of the transfer port. This action of the leading ball is caused by the rotation of the worm 3 imparting a rolling action to all the balls in the nut groove, whereby they travel along the groove in the manner of the planet wheels in an epicyclic gearing. By this means as soon as the leading ball reaches the radiused end face of the appropriate plug, the pressure of the balls behind it forces it to act as described, when the action of the succeeding balls, still rolling in the nut groove, and being applied below the centre point of the leading ball by virtue of its having so lifted, completes the transfer of the leading ball into the transfer port and thence to the start of the helix via the appropriately radiused end face of the other plug at other end of the transfer port.

It will be seen that the transfer action of the balls is continuous and that as one ball leaves the nut groove another ball, already transferred and at the other end of the port, enters the nut groove at the start of the helix. The two plugs 8 and 9 are facsimiles of each other, therefore whereas in one rotation of the worm the left-hand plug 8, for example, acts as the lifting and transferring agent, and the right-hand one simply as a re-entry member, if the rotation of worm be reversed, the right-hand plug 9 becomes the lifting and transferring agent and the left-hand plug becomes simply the re-entry member: thus a continuous and automatic circulation of the balls takes place no matter what the rotation of the worm.

In practice it is preferred to fill the nut helix fully with balls and part of the transfer port, with the exception of a space equivalent to about one-half to one ball. It is preferred to use a one-start helix, but if desired a multi-start groove or helix can be used, with appropriate number of deflector plugs, but in such case some of the transfer ports must not be open to the worm crests, but must be high enough in the material of the nut to pass over the intervening nut grooves of the other starts of helix. It will be seen that by such an arrangement a practically endless arrangement of the balls is provided restrained within the part of the nut amounting to substantially one helix-midway between the ends of the nut containing such helix and not requiring a cage to hold them in position, and further that the worm may make an infinite number of turns without affecting the axial position of the helix-full of balls.

The transfer port may, as shown in Figs. 7, 8 and 9 be a slot passing completely through the wall of the nut, and its roof be formed by the interior surface of the cylindrical housing 2 (as shown in Fig. 9), or it may be formed in the material of the nut between adjacent grooves (if, of the preferred single-start type helix) so as to leave its cover or roof integral as shown in Figs. 13, 14 and 15: or as shown in Figs. 10, 11 and 12 I may mill the nut right through from the outside, afterwards covering in the port or slot so as to prevent loss of the balls being transferred, in any suitable manner, as by a plate 10 (Figs. 7 and 8) secured by screws or "spun-in" as at 11. The operative axial length of the port 7 is always, for a single start helix, equal to approximately one lead or pitch of such helix plus one ball diameter. The cover plate 10 is arranged with suitably shaped projections or inwardly dependent lugs 12 at each end substantially over the start and finish of the helix, the faces of these lugs that engage with the ball being lifted and the ball being replaced in the helix groove being so sloped as to be parallel with the flank of worm opposite to them and approximately the diameter of one ball distant from such flanks, so as to ensure the respective ball being constrained and guided to become properly transferred as already described, under the influence of the circumferential rolling action of the helix-full of balls under load.

If it is preferred to adopt an absolutely complete helix-full of balls always taking the loads, the transfer port is suitably directed in relation to the axis of worm and nut so that the leading ball does not reach the appropriate deflector plug until a transferred ball has been replaced into the helix start on a line axial of the ball about to be transferred; if the port is arranged axially of the worm, one helix-full of balls less one ball is operative.

The deflector plugs may be of any suitable form, and may if desired be inserted in the nut material or otherwise not only tangentially as described, but radially or otherwise, or may be attached to or form part of suitable end-plates secured to the end faces of grooved portion of the nut, or may form part of the coverplate for port. In the embodiment shown in Figs. 10, 11 and 12 they are slightly tapered pins so that with their axes tangential to the pitch circle of helix-full of balls, their inner ends are one-half diameter in the nut groove and one-half diameter in the worm groove as will be clear by reference to Fig. 11, but they are clear from and do not touch either of the grooves, or particularly they do not touch the worm groove. By this means it follows that the plug diameters will be less than the diameter of the balls, but if desired they may be of any suitable diameter but with their inner ends suitably shaped to clear the worm groove. Preferably they are driven fast into the nut at an angle to the axis corresponding to the helix angle of groove therein, and with their appropriately radiused end faces presented suitably to meet and guide the leading ball and leaving ball as already explained.

In Figs. 13, 14 and 15 is shown a preferred method of shaping and arranging the deflector plugs, in the form of blocks, this method also showing how the transfer port can be wholly integral with the nut. In this modification the blocks 8 and 9 are shaped of helical form so as to nest concentrically between nut and worm and to lie in the helical grooves therein (see Fig. 15) and consequently assuming that the worm and nut grooves 4 and 5 each have their two flank faces at 90 degrees to each other, a radial cross section through a block will be substantially square in outline as shown in Fig. 13, whilst the axis of each block will coincide with the pitch of the helix. The corners of each block will be flattened down as at 8c to correspond with the complete cross section of the grooves in worm and nut, it being understood that the two flats or sides of the blocks will not quite contact with the two flanks or bottom of groove in the worm, but will lie closely thereto but not touching. Each deflector block is formed with a radial peg 14, which as shown in dotted lines in Fig. 15, can pass completely through the wall of the nut, and then be riveted into a countersink as at 14a, thereby affording a solid mounting in the nut, with the two upper flats or sides of blocks fast to the corresponding flanks of groove in the nut, but the two lower sides which project into the groove in the worm are slightly clear from the corresponding flanks of worm groove. Alternatively these pegs may be replaced by suitable separate rivets, with the blocks and nut drilled to receive them; or any other suitable means, such as welding, screws or the like may be used to render the blocks fast to the nut groove, or to such other part of nut as may be desired.

In the embodiment illustrated in Figs. 10, 11 and 12, the nut has its helical groove mid-way between its ends, but as shown in Figs. 7, 8 and 9 the worm may be at one end and the other end radially apertured by a parallel hole as at 15 to receive the ball-headed pin 16 projecting laterally from a rocker arm 17 carried by one end of the cross shaft 18, from the other end of which cross shaft the drop arm 19 radiates. Advantage can be taken of this hole 15 to insert one of the milling tools for sinking or boring the transfer port 7, such a tool being indicated by the dotted lines 20 in Fig. 13. By reference to this figure it will be clearly seen how the transfer port 7 can be an integral machining in the nut and how it is effected by inserting at angles of 45° to the axis of the nut, milling tools 20 and 21, one milling operation being effected by feeding the tool 20 through the side opening 15 in the unthreaded skirt-like integral extension 1a of the nut so that a half-spherical mill 20a forms a recess in the root or bore of the threaded part of the nut to form one end of the transfer port, and a corresponding operation effected by inserting the tool 21 at the stated angle in the open end of the threaded part of the nut forms the other end of the transfer port, the sloping ends 12a thus formed being equivalent to the dependent lugs 12, Fig. 7, and the zones of operation of the two tools where they cut into the nut overlapping so that there is no irregularity in the shape of the transfer port, the result being that the width of the port is equal to diameter of said tool throughout its length. The said transfer port in cross section is semi-circular (as seen in Fig. 15) where it enters the nut beyond the root of the threads, and as the transfer port also cuts through the threads in axial direction, and as also it has semi-circular ends it will be appreciated that the shape of the transfer port agrees with the ballshape and is such as to facilitate ingress and egress of the balls in a rolling action. An important feature of this embodiment of my invention is that the said deflector blocks 8 and 9 at the ends of the transfer port are formed with arcuately recessed or radiused faces 8d and 9d, these faces being such that when the balls leave the worm groove, the leaving edge of such groove forms the centre point of the radiused faces 8d or 9d formed in the opposed block against which the ball rolls, and the radius from such leaving edge to the radiused faces of the blocks is equal to a ball diameter, plus a suitable clearance amount, e. g. totalling 1½ diameters. This description of the radiused end faces 8d, 9d, of blocks 8 and 9 also applies if the plug faces 8b and 9b are used, that is, no matter whether plugs or blocks or any other type of abutment is used, their operating faces presented to the balls will be radiused as described in order to cause the balls to swing round the corner into or out of the port. A detail view of blocks 8, 9 showing radiused faces 8d, 9d is given in Figs. 16 and 17. A modification is shown in Figs. 18 and 19 where although the radiused faces 8d, 9d are retained, another radius 8e, 9e equal to the radius of the balls, and at right angles to radius 8d, 9d, is formed on end faces of 8d, 9d of the blocks 8, 9. The object of this modification is to afford a second guiding face for the balls on faces 8d, 9d which in addition to the surface or radius 8d, 9d, will partially embrace the balls during their initial movement into the port and retain them closely but freely against the opposing flank of groove in worm. Because this second radiusing 8e, 9e partially performs the same function as the sloping ends 12a, Fig. 13, or the lugs 12, Fig. 10, if desired this modification permits the elimination of said ends 12a or lugs 12, and the milling of port 7 as a plain slot with square ends as Figs. 10, 11 or 12, the roof to port being formed by either a plate, the inside surface of bore in housing, or integrally of the nut material, as already described. Where the already-mentioned construction is used whereby the interior surface of the cylindrical housing 2 itself forms the roof or outermost portion of the port, the formation and machining of the port is obviously facilitated because the milling cutter can be entered into the periphery of nut at the appropriate angles to the axis thereof so as to agree with the angle of flanks of worm and nut as already described, from the outside of nut, so that in this case no entry of the cutter through the hole for ball peg is necessary. Thus the port is easily and quickly machined without any interference to the cutter and with the proper sloping ends which with the opposing flanks of worm groove forms the beginning and end of the port itself.

The aperture left in the nut periphery by the entry of the cutter is of course closed when the parts are assembled, by the inside of the cylindrical bore in housing 2 in which the nut slides in piston-like manner, the dimensions of the crest diameter of worm and the peripheral or outside diameter of nut being arranged so that the distance from crest of worm to inside of bore of housing 2 is equal to a ball diameter plus suitable clearance to enable the balls to pass over the worm crest freely, and the width of the port, i. e. the cutter diameter being also the diameter of a ball plus a clearance dimension. It will be seen that in this case it is not necessary for the cutter to have semi-spherical ends, as the cutter can pass right through the nut wall and e. g. as far as the nut axis, being thus with their ends entirely free from the material of nut.

My invention is not necessarily limited to a steering gear in which the nut has a movement of translation imparted to it by a worm, as it will be apparent by reference to Figs. 20 and 21 that the nut 1 can be attached to the rotatable steering shaft 3, and that a short worm 22 can be passed axially through the nut, the balls 6 and the transfer port 7 being provided in any of the manners hereinbefore described. The axial dimension of the worm 22 need only be a few inches for normal requirements, i. e. slightly longer than the length of the arc through which the outer end of the rocker arm 17 has to travel from one side full lock to the other, plus of course the axial length of the nut. The worm can be formed integral with a relatively short cylindrical member or head 22a at one end of the worm such cylindrical member being formed in its periphery with a radial parallel hole 23 which receives the ball head of the peg 16 projecting laterally from the outer end of the rocker arm 17, e. g. on the same principle as described in U. S. A. Patent No. 1,893,764, the cylindrical member in the present instance taking the place of the axially traversable cylindrical nut described in the said patent. This cylindrical member is preferably hollow and in effect constitutes a flange-like enlargement or bolt-head at one end of the relatively concentric worm. It is supported for longitudinal sliding and partially rotating movement in the cylindrical housing 2 and the arcuate travel of the rocker arm will impart a partial rotation of the cylindrical member which is consequently supported after the fashion of a bearing or piston in the housing in the same manner as the nut in the said patent. Actually of course the ball head of the said peg need not be a complete sphere as in effect only a portion of the spherical surface bears in the appropriate part or wall of the cylindrical member. The worm can be drilled axially for passage of any central controls etc.

The nut 1 is a short cylindrical member, i. e. having an axial dimension slightly greater than required to take the single helix of balls 6 and it is supported in the housing by a circumferential ball or other bearing acting as a double thrust and journal bearing, e. g. a single row of balls 24 engaged in a circumferential groove in the nut and disposed between two race rings 25 fitted snugly in an annular recess in the said housing, or if desired a double row double thrust type of bearing may be adopted e. g. two rows of balls engaged against bevelled or radiused annular faces at the ends or elsewhere of the nut and located in axially opposed arcuate section channels in two rings fitted snugly in the housing, in the usual known construction. The bearing or bearings for the nut can be located by forming the cylindrical housing as two parts 2c—2d abutted end-to-end at the location of the bearing or bearings for the nut, adjustment for the bearing being provided by, for example, shim washers. The nut 1 has a relatively short cylindrical extension 1b at its upper annular side in which fits the lower end of the inner steering column 3, the requisite attachment being effected by riveting or other suitable means as at 3a.

The lower end of the steering column may be flared or enlarged as shown—if its inside diameter is less than the diameter of worm—a sufficient distance to accommodate the worm when fully retracted into the column which occurs on one steering lock. The lower cylindrical part of the housing 2 is formed with a box 25 to accommodate the rocker arm and an arcuate slot 26 to allow the said peg to enter the radial hole 23 in cylindrical worm head, the spindle 18 of the rocker arm being supported in a transverse tubular enlargement 18a of the said housing, and normally passing under the cylindrical portion housing the worm and at right angles thereto, in the usual and known construction.

The foregoing construction has the advantage that the load carrying capacity of the helix of balls can be increased by increasing the diameter of the balls without the corresponding increase in difference in helix angle of the helical grooves of the nut and worm proving detrimental to the efficiency of the gear, it being apparent that the greater the diameter of the balls, the lesser the helix angle of the nut in relation to the worm. In the previously described steering gear in which the handwheel is in effect attached to the worm, shocks applied to the said ball headed peg from the drop-arm, then to the nut, and from thence through the balls to the helix of the worm necessarily cause what is known as reaction "snatch" to the handwheel, the extent of "snatch" increasing proportionally to the increase in helix angle on the screw, and not depending on the helix angle in the nut. However in the present embodiment of my invention the handwheel is attached, in effect, to the member (i. e. the nut) which by reason of its lower helix angle is subject to the lesser tendency to rotate under the reaction of the drop arm. The fact that the nut is therefore subject to a greater axial shock or load is immaterial because the axial loading is taken up by the thrust bearing or bearings, and being self-contained in the housing does not affect the handwheel. An important feature of the present invention therefore is that the threaded member having the lower helix angle is utilised to receive reaction shocks relative to the steering handwheel. An advantage arising out of this is that the higher helix member, viz. the worm, is utilised for forward steering, resulting in increased efficiency and the possibility of use of a high ratio "handwheel-to-road wheel" steering action, that is reduced number of steering handwheel turns from lock to lock, whilst obviating transmission of road reaction shocks to the handwheel, unavoidable in other steering gears except by use of detrimental low ratios, that is, increased steering wheel turns from lock to lock.

An advantage of the present invention when applied to the type of steering gear in which the nut can rotate as a bearing on its periphery but has no axial movement in the appropriate cylindrical housing is that the worm is in effect supported at each end by bearing surfaces, the one that is subject to relatively quick rotation being constituted by the said balls, and the other being the plain bearing of the head 22a in the housing bore, this bearing being subject to only small and slow sliding and partially rotatory movements. Such an arrangement is advantageous when the worm is recessed in its head periphery as just described for the direct reception of a ball headed peg projecting from the rocker arm, because it simplifies considerably the heretofore considered necessity of very accurately ensuring correct concentric alignment of the nut, worm shaft and housing. Also by supporting the worm in the nut by the relatively short axial dimension containing a single helix of balls it is possible that reaction stresses will be more effectively absorbed between the nut and the housing in which it partly rotates and slides, by reason that the length of 22a flange or head of worm forming such peripheral bearing in the cylindrical housing may be shortened to permit some degree of "jamming" when such reaction shocks occur at the ball-headed peg in the rocker arm.

This adaptation of my invention may be summarised as attaching the handwheel to a nut, said nut being capable of rotation but not longitudinal movement, with a short worm engaging in the nut through rolling-friction members such as steel balls, the other end of worm being enlarged and of circular bolt-head like shape, sliding in piston-like manner in the cylindrical bore of housing and being restrained from rotatory movement at any given position of the steering gear by a ball headed peg engaging in a radial parallel hole in said head of worm, said peg being fast to a rocker arm and rocker shaft and drop arm as in known construction. Thus when the handwheel is rotated, the nut feeds the worm longitudinally and the worm causes the rocker arm to swing about the axis of the rocker shaft to which is attached the usual drop arm.

It will be readily understood that if desired in any of the constructions shown an opposite modification can be adopted whereby the transfer port is formed in the worm instead of the nut, the nut then being increased as required in axial length to permit the necessary axial displacement. In such modification the blocks 8, 9 are most suitable, and are fast in the worm groove and clearance in the nut groove. Obviously in this modification either the nut or the worm may be the member imparting translative or rotary or other motion to a rocker arm or other mechanism connected to the road wheels of the vehicle.

I claim:

1. Worm and nut steering gear comprising an internally helically grooved nut member, an externally helically grooved worm member, and a plurality of balls located about the worm, and engaged in the said grooves of the nut and worm member, one of said members being rotatable relatively to the other to apply a translative movement to the other through the medium of said balls, said balls being free to roll in both said grooves during rotation of the appropriate helically grooved member, a substantially axial port in the nut forming a passage for the balls exposed to said worm throughout its length, said passage extending from end to end of a single helix of the groove in the nut, and deflecting abutments at the ends of the port adapted to deflect the balls over a crest of the worm member and to afford rolling and guiding surfaces for the balls when entering and leaving the port.

2. Worm and nut steering gear comprising an internally helically grooved nut member, an externally helically grooved worm member, and a plurality of balls located about the worm, and engaged in the said grooves of the nut and worm member, one of said members being rotatable relatively to the other to apply a translative movement to the other through the medium of said balls, said balls being free to roll in both said grooves during rotation of the appropriate helically grooved member, a port in the nut forming a passage for the balls extending across a crest of the worm substantially axially from end to end of a single helix of the groove in the nut and wholly exposed to the worm, and deflecting abutments at the ends of the port adapted to afford rolling and guiding surfaces for the balls when entering and leaving the port, said transfer port being a slot through the nut, the inner surface of said slot forming the roof of said port.

3. Worm and nut steering gear comprising an internally helically grooved nut member, an externally helically grooved worm member, and a plurality of balls located about the worm, and engaged in the said grooves of the nut and worm member, one of said members being rotatable relatively to the other to apply a translative movement to the other through the medium of said balls, said balls being free to roll in both said grooves during rotation of the appropriate helically grooved member, and a port in the nut exposed throughout its length to said worm, said port extending substantially axially from end to end of a substantially single convolution of the nut groove and shaped at its ends to form abutment and guiding surfaces substantially in agreement with the cross-section shape of said groove and with the ends of said convolution to deflect the balls from one end of said convolution along the port to the other end.

4. Worm and nut steering gear comprising an internally helically grooved nut member, an externally helically grooved worm member, and a plurality of balls located about the worm, and engaged in the said grooves of the nut and worm member, one of said members being rotatable relatively to the other to apply a translative movement to the other through the medium of said balls, said balls being free to roll in both said grooves during rotation of the appropriate helically grooved member, a port in the nut forming a passage for the balls extending substantially from end to end of a single helix of the nut groove to afford an endless track for the balls, a pair of ball deflecting blocks carried by the nut and located in the helical grooves in the worm and nut, said deflecting blocks having opposed ends located in the ends of said port substantially in curvilinear continuity with the ends of a single convolution of the helical groove of the nut, and causing the balls to make a substantially right-angle turn over the crest of the worm out of the helix into the port, or vice-versa.

5. Worm and nut steering gear comprising a housing, a nut member therein, a worm member passed through the nut, complementary opposed helical grooves in the nut and worm, a complete helix of balls forming a driving couple between nut and worm rolling freely in the two opposed grooves, and means in the nut to restrain the path of movement of the balls to substantially a single helix of the nut groove, for an infinite number of turns of the worm without leaving the worm.

6. Worm and nut steering gear comprising a helically grooved nut, a worm in the nut, a substantially endless helix of balls between the worm and nut individually having rolling contact with the helical grooves in the nut and worm to form a driving couple between the worm and nut, and a transfer port carried across the ends of a complete convolution of one of the helical grooves to restrain the balls within a predetermined endless helical track between nut and worm, the crest of the other helical groove forming one wall of the transfer port.

7. Worm and nut steering gear comprising a helically grooved nut, a worm in the nut, a substantially endless helix of balls rolling in the opposed helically grooved parts of the worm and nut, a substantially axially directed transfer port connected across a single convolution of one of the helical grooves and located between the ends of the nut, and deflector abutments adapted to deflect the balls successively across a crest of the worm with arcuately recessed faces at the ends of the transfer port, said arcuately recessed faces each having a radius not less than one ball diameter.

8. Worm and nut steering gear comprising a helically grooved nut, a worm in the nut, a substantially endless helix of balls rolling in the opposed helically grooved parts of the worm and nut, a substantially axially directed transfer port connected across a single convolution of one of the helical grooves and located between the ends of the nut, and deflector abutments with arcuately recessed faces at the ends of the transfer port, said arcuately recessed faces being substantially part spherical and with a radius not less than one ball diameter.

9. Worm and nut steering gear comprising a helically grooved nut, a worm in the nut, a substantially endless helix of balls rolling in the opposed helically grooved parts of the worm and nut, a substantially axially directed transfer port connected across a single convolution of one of the helical grooves and located between the ends of the nut, and deflector abutments with arcuately recessed faces at the ends of the transfer port, said arcuately recessed faces each having two radii having intersecting axes.

10. In worm and nut steering gear opposed complementary helical grooves in the worm and nut, balls fitting and rolling in said grooves and forming a driving couple between the worm and nut for both directions of relative rotary steering movement of worm and nut, and means to restrain the anti-friction members within a predetermined endless track of travel between the ends of the nut about the axis of the worm, such endless track being wholly exposed to the worm.

11. Worm and nut steering gear comprising a helically grooved nut and worm and a substantially single helix of balls individually having rolling contact in the helical grooves in the nut and the helical grooves in the worm and forming a driving couple between the nut and worm for both directions of steering movement, the helix of balls traversing an endless path exposed throughout its length to said worm, and means displacing the balls translatively across a crest of the worm to effect the continuity of said path of traverse of the balls.

12. In a worm and nut steering gear, a worm member and a nut member disposed about the worm member, means for converting the rotation of one of said members to apply translative movement to the other member, said means comprising balls between the worm and nut, and a transfer port exposed throughout its length to said worm, said port extending along the inner side of the nut and joining the approximate ends of a single helix of the groove in the worm to prevent the balls from passing beyond the ends of the nut.

13. Worm and nut steering gear comprising a worm member and a nut disposed about the worm, one of said members being rotatable, an annular space between worm and nut, a helical groove inside the nut and a helical groove in the worm member, said grooves together forming a helical space between worm and nut, balls spanning said helical space and having free rolling engagement in said grooves, and a transfer port in the nut open to and permanently spanning a crest part of the worm to afford an endless path of travel of the balls about the worm whilst restraining the balls from passing beyond the ends of the nut.

14. Worm and nut steering gear comprising a cylindrical housing, a nut member supported for rotation in the housing, a worm member within said nut, a helical groove in the nut opposed to the helical groove of the worm, a rotatable steering shaft carrying one of said members for rotating it to impart a movement of translation to the other member, a rocker arm, a substantially universal joint connecting the rocker arm to said latter member, so that said latter member moves angularly about its axis during its movement of translation, a plurality of balls fitting and rolling in the grooves of the worm and nut members to form a rolling bearing driving couple between said two members, and means displacing the balls successively transversely across a crest of the worm to afford an endless path of travel exposed to said worm throughout its length for the balls between worm and nut.

15. In worm and nut steering gear opposed complementary helical grooves in the worm and nut, anti-friction members rolling in said grooves and forming a driving couple between the worm and nut, and a transfer port joining the approximate ends of a single helix of the groove in the worm and nut, the inner wall of said port being a crest part of the worm so that the port forms an endless or constant-circulation track in the nut for the anti-friction members wholly exposed to the worm.

16. Steering gear according to claim 1, wherein said abutments are shaped so as to co-operate for either direction of relative rotation of the worm and nut to guide the balls from the worm into the port and to guide the balls from the port back into the worm and to cause the balls to pass through a substantially right angled turn in said port over the crest of the worm.

17. Steering gear according to claim 1, wherein said abutments form guiding surfaces substantially in agreement with the cross-section shape of said groove and with the ends of said single helix to deflect the balls from one end of said single helix along the port to the other end.

JOHN GEORGE DOUGLAS.